United States Patent
Sotgiu

(10) Patent No.: US 8,342,223 B2
(45) Date of Patent: Jan. 1, 2013

(54) METHOD OF AND APPARATUS FOR FITTING OR REMOVING A MOTOR VEHICLE TYRE

(75) Inventor: Paolo Sotgiu, Modena (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 158 days.

(21) Appl. No.: 12/426,080

(22) Filed: Apr. 17, 2009

(65) Prior Publication Data
US 2009/0266494 A1   Oct. 29, 2009

(30) Foreign Application Priority Data
Apr. 17, 2008   (EP) .................................... 08007532

(51) Int. Cl.
*B60C 25/132* (2006.01)
*B60C 25/135* (2006.01)

(52) U.S. Cl. ...................................... 157/1.28; 157/1.24

(58) Field of Classification Search ............. 157/1, 1.24, 157/1.26, 1.28; 356/139.09, 155
See application file for complete search history.

(56) References Cited

U.S. PATENT DOCUMENTS

| | | | |
|---|---|---|---|
| 5,458,177 A * | 10/1995 | Magnani | 157/1.24 |
| 6,527,032 B2 * | 3/2003 | Corghi | 157/1.28 |
| 6,877,544 B2 * | 4/2005 | Kane et al. | 157/1.24 |
| 7,089,987 B2 * | 8/2006 | Gonzaga | 157/1.24 |
| 7,199,873 B2 * | 4/2007 | Braghiroli | 356/139.09 |
| 7,495,755 B2 * | 2/2009 | Voeller et al. | 356/139.09 |
| 7,768,632 B2 * | 8/2010 | Sotgiu | 356/139.09 |

FOREIGN PATENT DOCUMENTS

| | | |
|---|---|---|
| DE | 25 29 343 A1 | 1/1977 |
| EP | 1 475 252 A1 | 4/2004 |
| EP | 1 593 533 A2 | 4/2005 |
| EP | 1 897 709 A1 | 3/2008 |

OTHER PUBLICATIONS

European Search Report issued in European Patent Application No. EP 08 00 7532, dated Aug. 18, 2008.

* cited by examiner

*Primary Examiner* — Hadi Shakeri

(74) *Attorney, Agent, or Firm* — McDermott Will & Emery LLP

(57) ABSTRACT

A method of and an apparatus for fitting or removing a tire 4 of a vehicle wheel 1, in which at least one fitting or removal tool 5 is guided parallel to the axis 11 of the vehicle wheel 1 and the vehicle wheel 1 is moved controllably perpendicularly to its wheel axis 11 in dependence on a rim contour along which the fitting or removal tool 5 is to be guided at a small spacing.

22 Claims, 4 Drawing Sheets

METHOD OF AND APPARATUS FOR FITTING OR REMOVING A MOTOR VEHICLE TYRE

TECHNICAL FIELD

The invention concerns a method of and an apparatus for fitting a tyre to a rim of a vehicle wheel or for removing a tyre from a rim of a vehicle wheel.

The invention concerns a method of and an apparatus for fitting a tyre to a rim of a vehicle wheel or for removing a tyre from a rim of a vehicle wheel.

BACKGROUND

For that purpose it is known from U.S. Pat. No. 3,877,505 to provide on the fitting or removal tool a sensing device in the form of a projection, for example of plastic material, which senses the radial outside surface (wheel rim well). That ensures that, in the tyre fitting or removal operation, the tool is held at a given spacing from the surface of the rim and the surface of the rim is not damaged by the hard material of the tool.

For that purpose it is known from U.S. Pat. No. 3,877,505 to provide on the fitting or removal tool a sensing device in the form of a projection, for example of plastic material, which senses the radial outside surface (wheel rim well). That ensures that, in the tyre fitting or removal operation, the tool is held at a given spacing from the surface of the rim and the surface of the rim is not damaged by the hard material of the tool.

It is further known from DE 25 29 343 B2 for the tyre fitting or removal tool to be moved along a control surface, which ensures that the tool is guided along the rim contour in the wheel rim well. In that case different control surfaces have to be provided, depending on the various wheel types involved.

It is further known from US 2004/0165180 A1 for one or more optical images of a wheel portion to be acquired by means of an imaging sensor device and in dependence thereon for service operations to be carried out on the vehicle wheel, for example by means of a tyre change system.

In the known methods and the known apparatuses, the movement of the at least one tyre fitting or removal tool is controlled in dependence on the contour or the geometrical configuration of the rim flange and the outside peripheral surface of the rim. In that case the tool performs relatively complicated movements in dependence on the various corrections concerned, in relation to the respective wheel types.

SUMMARY

The problem of the invention is that of providing for a fitting or removal operation which treats the rim carefully, and in which the tool does not touch the rim surface, by means of a simple motion control system.

In the case of the method that problem is solved by the features of claim 1 and in the case of the apparatus it is solved by the features of claim 12.

The problem of the invention is that of providing for a fitting or removal operation which treats the rim carefully, and in which the tool does not touch the rim surface, by means of a simple motion control system.

In the case of the method that problem is solved by the features of claim 1 and in the case of the apparatus it is solved by the features of claim 14.

The invention provides that the at least one fitting or removal tool performs only a movement which is parallel to the axis of the vehicle wheel and the vehicle wheel is controlled in its movement perpendicularly to its axis in dependence on the sensed rim contour. Advantageously, the invention provides that the controlled movement is a simple linear movement which the motor vehicle wheel performs in dependence on the sensed rim contour. The at least one fitting or removal tool also performs only a linear movement parallel to the wheel axis, in the tyre fitting or removal operation. The linear movement of the fitting or removal tool is effected independently of the rim contour. That movement of the fitting or removal tool, which is in parallel relationship with the wheel axis, can be effected at a predetermined, in particular constant speed. By way of example two bead release tools which are moved towards each other and with which the tyre beads are pressed away from the rim flanges towards the central plane of the wheel are moved in parallel relationship with the axis of the wheel by means of a suitable drive, for example an electric-motor spindle drive.

It is also possible for a hook-shaped fitting or removal finger to be moved past the rim flange towards the central plane of the wheel, in parallel relationship with the axis of the wheel, in order to engage the tyre bead.

So that the respective fitting or removal tool does not contact the rim flange and the rim well surface, the linear movement of the vehicle wheel, which is perpendicular to the axis of the wheel, is controlled in dependence on the rim contour in a plane passing through the axis of the wheel, in such a way that a small spacing is maintained between the tool and the outside periphery of the rim flange and the rim well surface adjoining same, during the fitting or removal movement of the tool. That controlled linear movement of the vehicle wheel provides that the tool does not contact the rim surface during the fitting or removal movement of the tool. The movement of the tool, in parallel relationship with the axis of the wheel, is effected independently of the outside rim contour.

Particularly during the tyre removal operation using a hook-shaped removal finger, after the tyre bead is engaged to release the tyre bead from the rim, the linear movement of the vehicle wheel is controlled in such a fashion that the removal finger which is moved in parallel relationship with the axis of the wheel moves away from the axis of the wheel at the same time.

BRIEF DESCRIPTION OF THE DRAWINGS

The invention is described in further detail hereinafter with reference to the Figures in which.

DETAILED DESCRIPTION

Figure 1:
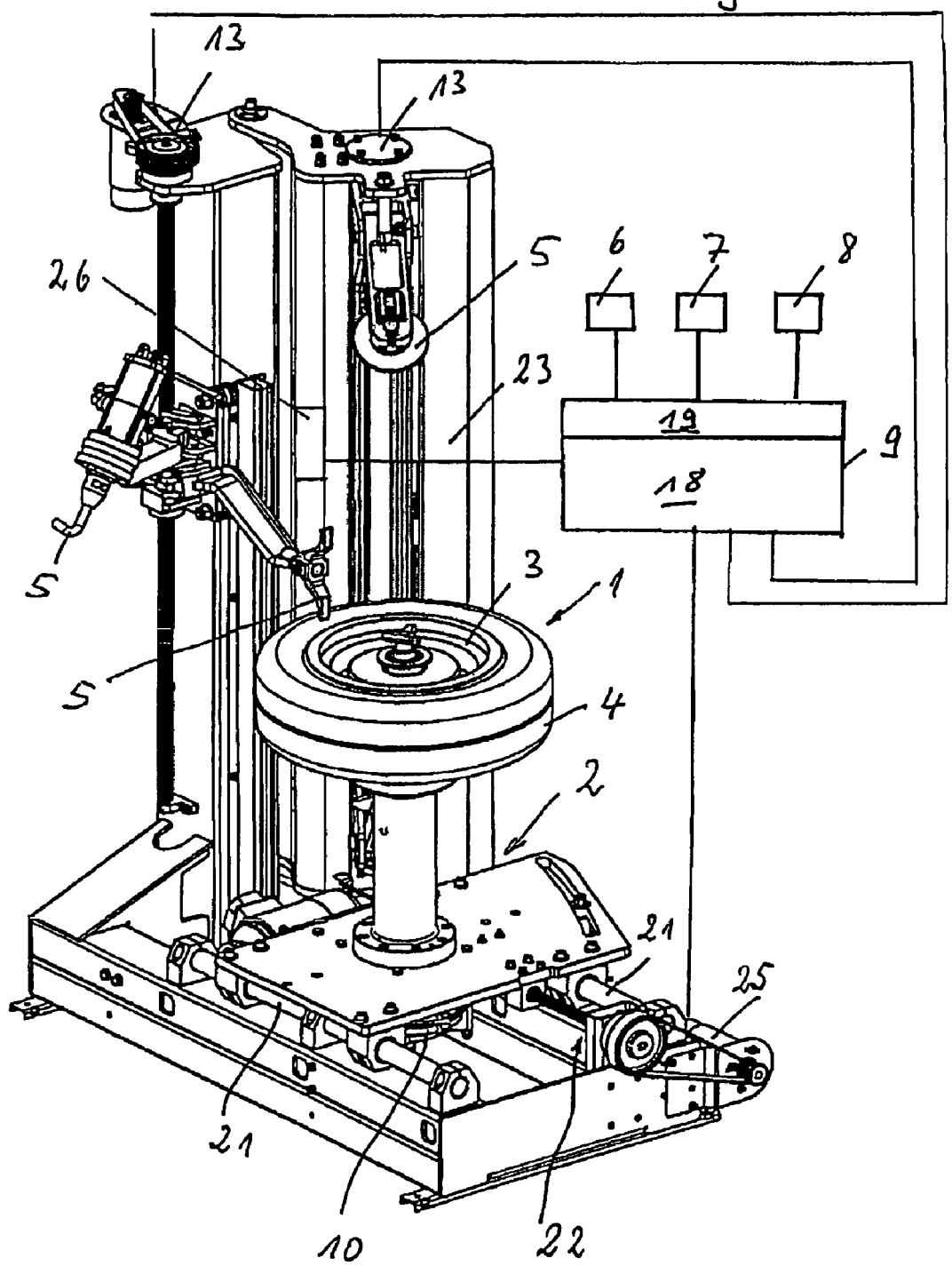
FIG. 1 shows an embodiment of an apparatus with which the invention can be carried into effect.
Figure 2:
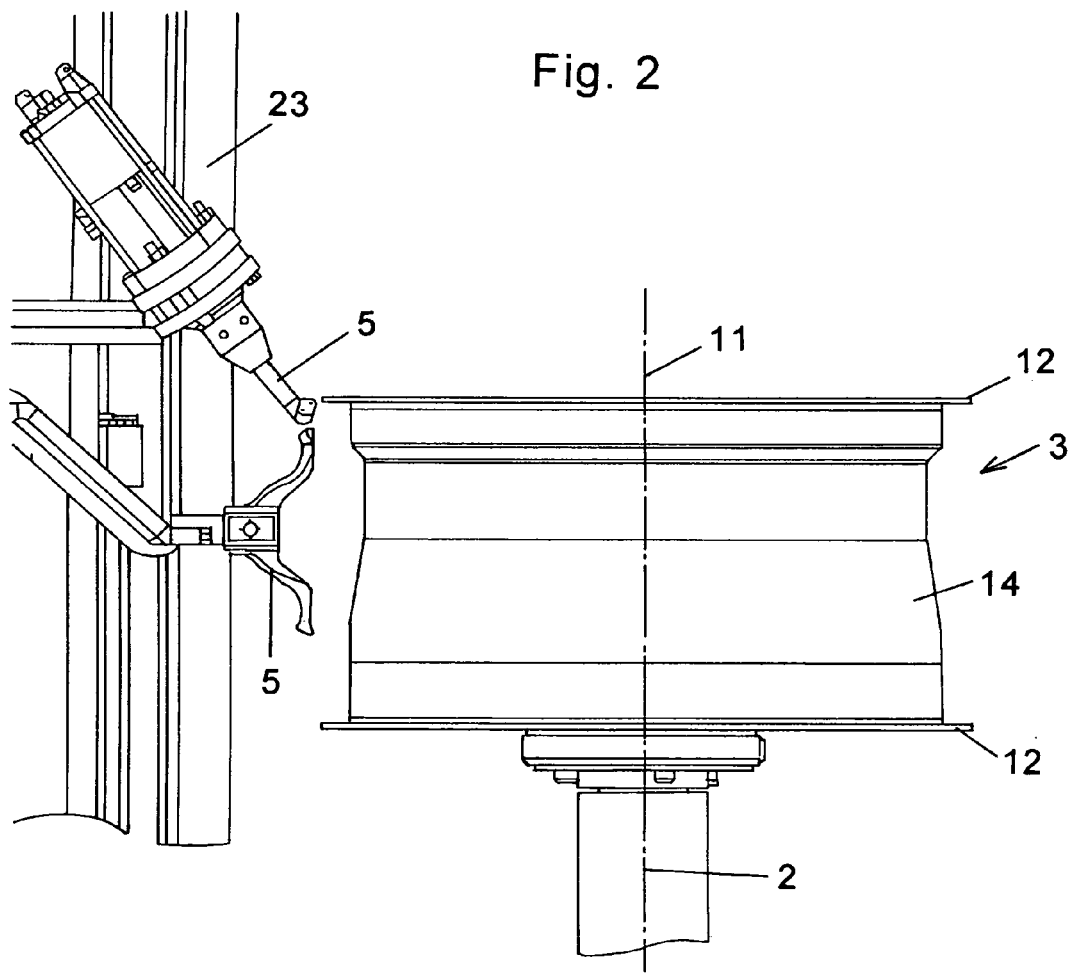
FIG. 2 shows a detail view of the embodiment with certain fitting or removal tools.
Figure 3:
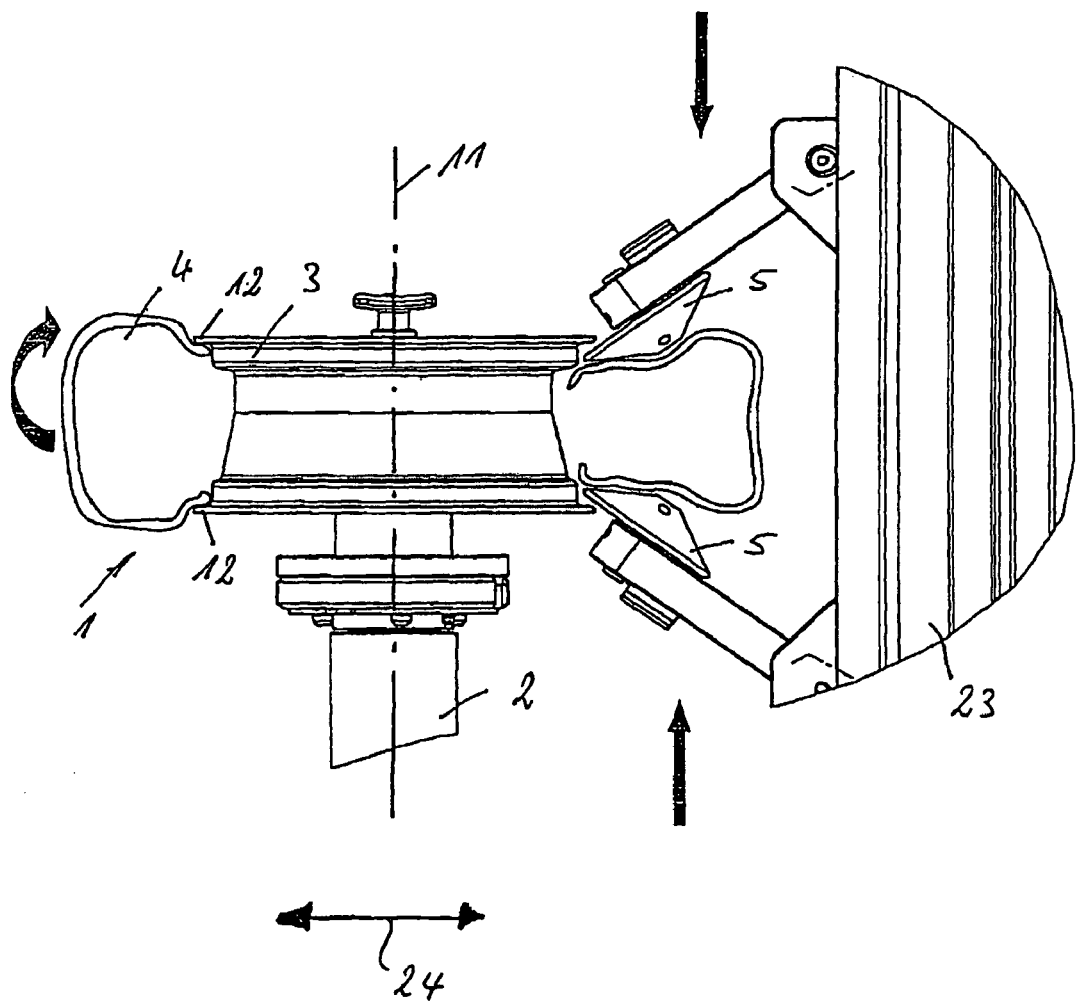
FIG. 3 shows a detail view of the FIG. 1 embodiment with further removal tools.

The embodiment illustrated by way of example in FIG. 1 includes a wheel mounting device 2 to which a rim of a motor vehicle wheel 1 can be fixed. The wheel mounting device 2 can be of a known structure. The rim 3 is connected to the wheel mounting device 2 in non-rotatable relationship therewith and in centered relationship with the axis 11 of the wheel by fixing means, in particular clamping means. By means of a rotary drive device 10 which can be in the form of an electric motor, it is possible for the wheel mounting device 2 to be caused to rotate. In that case the rotary drive is about the axis 11 of the wheel (FIGS. 2 and 3).

Figure 4:
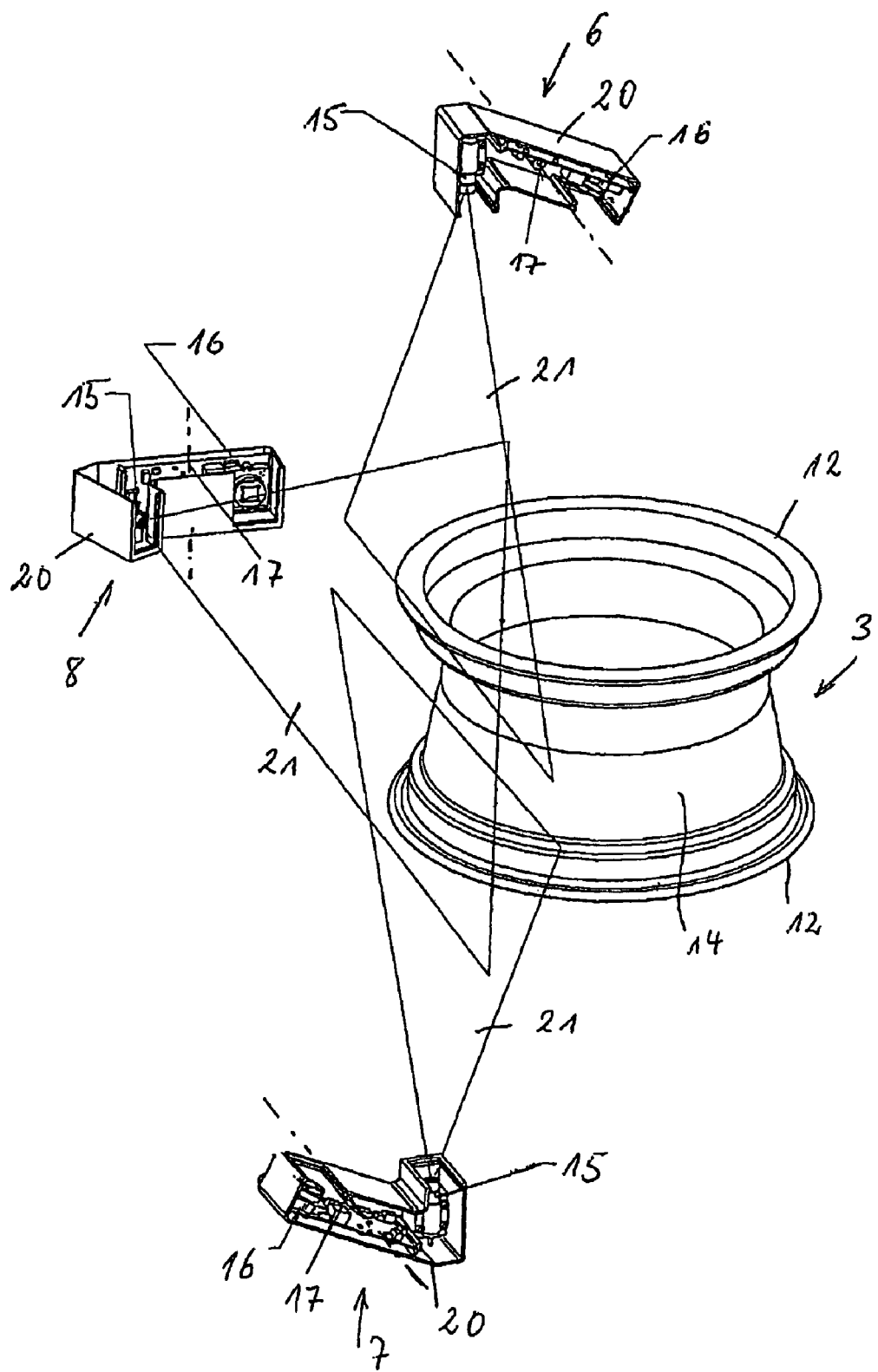
FIG. 4 shows sensing devices for sensing the rim, in particular the outside peripheral surface of the rim in the region of the rim flanges and in the region of the rim well, wherein the sensing devices can be provided on the embodiment shown in FIG. 1.

In the illustrated embodiment, as diagrammatically shown in FIG. 4, optical sensing devices 6, 7 and 8 can be provided for sensing the rim contour at the outside peripheral surface of the rim 3. The sensing devices 6 and 7 serve for sensing the rim contour in the region of the rim flanges 12 while the sensing device 8 serves for sensing the contour of the rim well 14. Instead of the optical sensing devices, other sensing devices which operate in a contactless mode on the basis of ultrasound or electromagnetic waves can also be employed. Sensing using mechanical sensing means is also possible.

The positions in space of the respective sensed points can be ascertained for example by distance measurement, for example using a triangulation process. Sensing devices suitable for that purpose are known from U.S. Pat. No. 6,535,281 and EP 1 515 129 A1 in relation to the acquisition of geometrical data of motor vehicle wheels. Each sensing device 6, 7 and 8 shown in FIG. 4 can have a light source, in particular a laser beam source 15, which are arranged with a light-sensitive sensor 16, for example a CCD sensor, on a common carrier. The respective common carriers 20 can be supported pivotably about axes 17 which are fixed with respect to the machine.

The geometrical data acquired by the sensing devices 6, 7 and 8 are passed to a control device 9. It evaluates the geometrical data for determining the rim contour on the outside peripheral surface of the rim. The rim contour is determined in particular in the region of the rim flanges 12 and the regions, adjoining same, of the rim well. For that purpose the control device 9 can have an electronic computer apparatus 18 and an electronic memory 19 for the ascertained contour data. The corresponding contours can be stored in the memory 19 for different types of wheel and, as is described in detail hereinafter, can be used when fitting or removing the tyre.

FIGS. 2 and 3 show various tyre removal tools which can be used in the embodiment of FIG. 1 for selective use when removing the tyre 4 from the rim 3.

FIG. 3 shows two tyre removal tools 5 in the form of bead release rollers. Those bead release rollers are moved towards each other in parallel relationship with the axis 11 of the wheel when pressing the tyre beads off the rim flanges. That linear guidance for the two removal tools 5 is provided at a pillar 23 which extends substantially parallel to the axis 11 of the wheel. In that removal operation, the two tyre beads are moved towards the central plane of the rim 3. The two tyre beads are released around the entire periphery of the rim by rotation of the vehicle wheel by means of the rotary drive device 10.

Before the actual tyre removal operation begins, a control device (9) controls a drive device 25 to position the wheel mounting device 2 and the vehicle wheel 1 with respect to the movement path of the fitting or removal tool 5 in dependence of the rim diameter of the vehicle wheel and/or the wheel diameter and then the removal tools are placed against the side walls of the tyre in the immediate proximity of the two peripheries of the rim flanges 2. For that purpose the removal tools 5 are moved until they come to bear against the two side walls of the tyre. The removal operation in which the two tyre beads are released from the rim is effected in such a way that the tyre removal tools 5 are disposed as closely as possible to the tyre beads but do not touch the rim surface. As the two removal tools are only moved in a direction parallel to the axis 11 of the vehicle wheel 1 supported at the wheel mounting device 2, the wheel mounting device 2 is moved in dependence on the rim contour in the region of the rim flanges and in the adjoining region thereof, perpendicularly to the axis 11 of the wheel. That movement is effected in controlled relationship in dependence on the rim contour which is determined by means of the above-described sensing devices 6, 7, 8 or which is stored for the respective type of wheel in the memory 19 of the control device 9.

That controlled movement of the wheel mounting device 2 is produced by a drive device 25 which for example is in the form of an electric motor. The drive device 25 is controlled by the control device 9 for that purpose. The torque of the drive device 25 is transmitted to the wheel mounting device 2 by way of a suitable transmission, for example a spindle drive 22. The wheel mounting device 2 is guided perpendicularly to the axis 11 of the wheel in that linear movement by means of a linear guide 21, for example in the form of two guide bars extending perpendicularly to the axis 11 of the wheel. That linear movement is identified by a double-headed arrow 24 in FIGS. 1 and 3.

A suitable drive device 13 is provided on the pillar 23 for the movement of the removal tools 5. That drive device 13 can also have an electric motor which by way of a spindle transmission produces the movement of the removal tools 5, in parallel relationship with the axis 11 of the wheel. A suitable drive device 13 can be also a hydraulic or pneumatic device. The linear movement of the tools can be detected by an one-dimensional sensor 26 which can be an optical sensor or another suitable sensor, for example a sensor which detects the movement of the spindle transmission. The one-dimensional sensor 26 is connected to the control device 9 for controlling the respective drive device 13 and thus the speed of the tool 5.

Instead of two removal tools 5 it is also possible to provide only one respective removal tool. In addition the removal tools 5 shown in FIG. 2 can also be used selectively for the operation of removing the tyre 4 from the rim 3. In that case, as discussed, the respective removal tool 5 is moved in a condition of hooking engagement in parallel relationship with the axis 11 of the wheel. In addition the above-described linear movement of the wheel mounting means which is controlled in dependence on the rim contour at the outer peripheral surface, in particular in the region of the rim flanges 6, 12, takes place. That provides that the respective hook-shaped removal tool is brought into engagement with the tyre bead without the removal tool coming into contact with the surface of the rim. The mode of operation of the upper hook-shaped removal tool shown in FIG. 2 is described in detail in U.S. Pat. No. 7,108,036 B2.

As was described in detail for the removal tools shown in the Figures, a tyre removal operation can be carried out in such a way as to treat the tyre and the rim gently and carefully, solely by virtue of control of the movement of the tyre mounting device 2 in dependence on the rim contour, in particular in the region of and in the proximity of the rim flanges 12, at the outer peripheral surface of the rim 3. When using a tyre fitting tool, fitting a tyre on the rim 3 can also be carried out by the above-described control of the wheel mounting device 2.

The respective tools 5 are controlled particularly only by one or more one-dimensional sensors 26. Such a one-dimensional sensor 26 detects the linear movement of the tool 5, particularly the vertically linear movement of the tool 5 during the tyre fitting or tyre removing operation. The one-dimensional sensor 26 can be designed as an optical sensor or another suitable sensor.

LIST OF REFERENCES

1 vehicle wheel
2 wheel mounting device 3 rim
4 tyre
5 fitting/removal tool
6 sensing device
7 sensing device
8 sensing device
9 control device
10 rotary drive device
11 axis of the wheel
12 rim flanges
13 drive device
14 rim well
15 light source (laser)
16 sensor
17 drive device
18 computer
19 memory
20 carrier
21 linear guide
22 spindle drive
23 pillar
24 double-headed arrow
25 drive device
26 one-dimensional sensor

The invention claimed is:

1. A method of fitting a tyre on to a rim of a vehicle wheel or removing a tyre from a rim of a vehicle wheel, in which at least one fitting or removal tool is moved controlledly past a rim flange of the rim without touching the rim flange, wherein:
   the at least one fitting or removal tool performs movement only in a parallel relationship with the axis of the vehicle wheel, and
   while the at least one fitting or removal tool performs movement only in the parallel relationship with the axis of the vehicle wheel during the fitting or removal operation, the vehicle wheel is controlledly moved perpendicularly to the axis of the vehicle wheel in dependence on a rim contour of a rim portion, along which the fitting or removal tool is guided.

2. The method according to claim 1, wherein the at least one fitting or removal tool is moved vertically and the vehicle wheel is moved horizontally.

3. The method according to claim 1, wherein the at least one fitting or removal tool is moved linearly at a controlled speed or a predetermined speed in the fitting or removal operation.

4. The method according to claim 3, wherein the predetermined speed is kept constant in the fitting or removal operation.

5. The method according to claim 3, wherein the speed of the fitting or removal tool is controlled by detecting its linear movement.

6. The method according to claim 1, wherein the at least one removal tool is moved to a condition of abutment against the tyre and is then moved at a controlled or predetermined speed during the removal operation.

7. The method according to one of claims 1 to 5, wherein at least the contour of the outside peripheral surface of the rim, along which the fitting or removal tool is moved during the fitting or removal operation, is sensed and the wheel rim is moved perpendicularly to the axis of the vehicle wheel in dependence on the sensed contour.

8. The method according to claim 7, wherein the sensing operation is effected contactlessly via an optical sensor.

9. The method according to claim 7, wherein the outside peripheral surface of the rim is sensed at least in the region along which the fitting or removal tool is guided.

10. The method according to claim 7, wherein the contour data which are obtained from the rim sensing operation are stored.

11. The method according to claim 7, wherein the contour data for a plurality of different wheel types are stored.

12. The method according to claim 11, wherein the movement of the vehicle wheel is controlled in dependence on the stored contour data for the wheel type of the vehicle wheel.

13. The method according to one of the preceding claims 1 to 5, wherein the position of the vehicle wheel with respect to the movement path of the fitting or removal tool is pre-adjusted by moving the vehicle wheel perpendicularly to the axis of the vehicle wheel in dependence of the rim diameter.

14. An apparatus for fitting a tyre on to a rim of a vehicle wheel or for removing a tyre from a rim of a vehicle wheel, comprising at least one fitting or removal tool, at least one sensing device, a control device, and a drive device to move the at least one fitting or removal tool, wherein:
   the sensing device is adapted to sense a rim contour at least in the region along which the fitting or removal tool is guided,
   the drive device is configured such that the at least one fitting or removal tool moves only in a parallel relationship to the axis of the vehicle wheel, and
   the control device is configured to control the movement of the vehicle wheel such that while the at least one fitting or removal tool performs movement only in the parallel relationship with the axis of the vehicle wheel during the fitting or removal operation, the vehicle wheel is moved perpendicularly to the axis of the vehicle wheel in dependence on the rim contour, along which the fitting or removal tool is guided.

15. The apparatus according to claim 14, wherein the control device has a memory or is connected to a memory in which rim contours of the outside rim periphery are stored for different wheel types.

16. The apparatus according to claim 15, wherein the control device and a second drive device connected thereto are adapted to control the movement of a wheel mounting device perpendicularly to the axis of a vehicle wheel disposed on the wheel mounting device in dependence on rim contours stored in the memory for different wheel types.

17. The apparatus according to claim 16, wherein the control device and the second drive device connected thereto are configured to position the vehicle wheel with respect to the movement path of the fitting or removal tool in dependence of the rim diameter of the vehicle wheel.

18. The apparatus according to claim 14, wherein the drive device is further configured such that the at least one fitting or removal tool moves only in the parallel relationship to the axis of the vehicle wheel as the vehicle wheel is moved perpendicularly to the axis of the vehicle wheel.

19. The apparatus according to claim 14 or claim 15, wherein the control device is connected to a drive device for the drive movement of the vehicle wheel perpendicularly to the axis of the vehicle wheel.

20. The apparatus according to claim 14 or claim 15, wherein there is provided a linear guide for the movement of the vehicle wheel perpendicularly to the axis of the vehicle wheel.

21. The apparatus according to one of the claim 14 or 15, wherein the control device and a second drive device connected thereto are configured to position the vehicle wheel with respect to the movement path of the fitting or removal tool in dependence of the rim diameter of the vehicle wheel.

22. The apparatus according to one of the claim 14, 15, or 16, wherein at least one one-dimensional sensor which detects the linear movement of the tool is connected to the control device to control the speed of the tool.

* * * * *